United States Patent [19]
Apstein

[11] 3,833,905
[45] Sept. 3, 1974

[54] PROXIMITY FUZE

[75] Inventor: Maurice Apstein, Bethesda, Md.

[73] Assignee: The United States of America as represented by the Secretary of the Army, Washington, D.C.

[22] Filed: Dec. 17, 1971

[21] Appl. No.: 210,262

[52] U.S. Cl. ............................ 343/7 PF, 102/70.2 P
[51] Int. Cl. ............................ F42c 13/04, G01s 9/02
[58] Field of Search ................ 102/70.2 P; 343/7 PF

[56] References Cited

UNITED STATES PATENTS

| | | | |
|---|---|---|---|
| 2,513,530 | 7/1950 | Stratton | 102/70.2 P X |
| 3,063,345 | 11/1962 | Harmon et al. | 343/7 PF X |
| 3,703,722 | 11/1972 | Gershberg | 343/5 PD |

*Primary Examiner*—T. H. Tubbesing
*Attorney, Agent, or Firm*—Edward J. Kelly; Herbert Berl; Saul Elbaum

[57] ABSTRACT

A proximity fuze employs a push-pull oscillator to generate an r–f signal, to be transmitted and to detect the doppler shift in the received r–f signal. In one embodiment the push-pull oscillator includes plural pairs of matched transistors and inductive feedback from a loop antenna. The transistors are connected to operate in series in respect to the r–f carrier and in parallel in respect to the doppler component of the received signal. As a result, the r–f carrier is cancelled out, oscillator loading is eliminated and the doppler signal appears at twice the voltage over that obtained with a single detector.

8 Claims, 4 Drawing Figures

PATENTED SEP 3 1974 3,833,905

INVENTOR.
MAURICE APSTEIN

BY

Harry M. Saragovitz, Edward J. Kelly, Herbert Berl & Saul Elbaum
ATTORNEYS

PROXIMITY FUZE

The invention described herein may be manufactured, used and licensed by or for the United States Government for governmental purposes without the payment to me of any royalty thereon.

BACKGROUND OF THE INVENTION

The present invention relates to proximity fuzes and, more particularly to such fuzes as employ an oscillator for the dual function of r–f generation and doppler detection.

It is known in the prior art to utilize an oscillator in a proximity fuze for the dual purpose of generating the signal to be transmitted and detecting the doppler frequency difference between the transmitted and received signals. Examples of proximity fuzes of this type are found in U.S. Pat. Nos. 2,513,530 (Stratton), 2,760,188 (Guanella et al), and 3,143,072 (Dell et al). In each of these patents, the non-linear operating characteristic of the disclosed oscillators are utilized as detectors of the frequency difference between the transmitted and received r–f signals. In each case the detected doppler frequency must be passed through a low pass filter, and in some cases passed through a separate detector, in order to completely eliminate the r–f signal from the following circuitry. If additional filtering and detection is not employed, the r–f carrier tends to overload the doppler amplifier, particularly where the latter is in the form of an integrated circuit. Where a separate detector is employed, the detector tends to load the oscillator and introduce losses. The additional detection and filtering increases the cost and size of the fuze; the latter, of course, is preferably as small as possible for most applications.

It is therefore an object of the present invention to provide a proximity fuze utilizing an oscillator for both r–f generation and doppler detection but wherein additional detection is eliminated and a minimum of r–f filtering is required.

SUMMARY OF THE INVENTION

I have found, according to one aspect of the present invention, that a push-pull oscillator, employed as a combined r–f generator and doppler detector in a proximity fuze, automatically separates the r–f carrier from the detected doppler frequency without the need for additional detection or filtering. Consequently, the push-pull oscillator can feed the doppler amplifier directly, thereby reducing the size and cost of the fuze. Moreover, I have found that where a loop antenna is utilized and comprises a portion of the reactive components of the oscillator, it is possible to provide a transistorized push-pull oscillator utilizing two or more pairs of matched transistors and inductive feedback coils, wherein the transistors are operable in series to provide higher r–f output power than was heretofore possible with transistorized oscillators in proximity fuze applications.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF PREFERRED EMBODIMENTS

Figure 1:
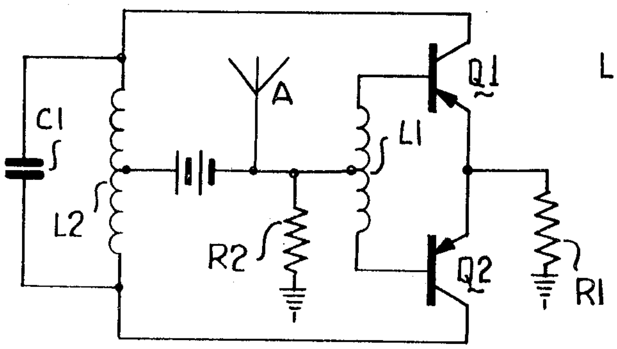
FIG. 1 is a schematic diagram of a push-pull oscillator circuit utilized in a proximity fuze.

Referring specifically to FIG. 1 of the accompanying drawings, a combined r–f generator and doppler detector for a proximity fuze is illustrated in the form of a push-pull oscillator. A pair of PNP transistors, Q1 and Q2, have their emitters tied together and coupled to ground via resistor R1. An r–f choke L1 is connected between the bases of Q1 and Q2 and has its center tap coupled to ground via resistor R2. A transmit-receive antenna A is also connected to the center tap of choke L1. An r–f tank circuit, comprising choke L2 and capacitor C1 connected in parallel, is connected between the collectors of Q1 and Q2. The center tap of choke L2 is connected to the positive terminal of a DC supply; the negative terminal of the supply is connected to the center tap of choke L1.

In one aspect of its operation, the circuit of FIG. 1 operates as a conventional push-pull oscillator having an r–f frequency determined by the tank circuit components L2, C1. This r–f frequency signal is emitted by antenna A and reflected by some object moving relative to the fuze. This object may be an aircraft, a surface, etc. The received signal appears at the source as a frequency which is shifted from the transmitted r–f signal in accordance with the relative movement between the fuze and the reflecting object. This frequency shift is the well-known doppler shift frequency. The transmitted signal and reflected signal beat together at the oscillator which acts as a detector to separate the beat or doppler frequency from the r–f signals. More specifically, the balanced nature of the push-pull oscillator causes the r–f frequency of the transmitted signal to balance out the r–f component of the reflected signal at the center-taps of chokes L1 and L2 and at the junction of the two emitters. That is, the two r–f frequency components are oppositely phased at these circuit points and cancel each other out. The doppler frequency, on the other hand, appears in phase at these circuit points at twice the voltage of a single detector. This provides a 6db gain across resistor R1 which can, therefore, be more efficiently extracted for amplification and subsequent processing. Thus, for all practical purposes, the r–f carrier is eliminated from the following circuitry by the oscillator itself, oscillator loading is eliminated, and doppler signal is doubled. In addition the r–f carrier does not saturate the doppler amplifier, a feature which is particularly important for amplifiers of the integrated circuit or transistorized type.

Figure 2:
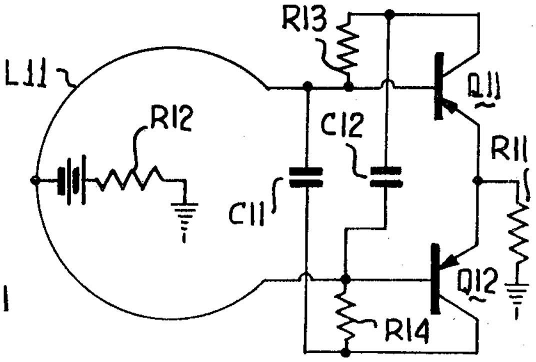
FIG. 2 is a schematic diagram of a push-pull oscillator circuit in combination with a loop antenna in a proximity fuze.

FIG. 2 illustrates a loop antenna version of the circuit of FIG. 1, the loop antenna forming part of the tank circuit which determines the r–f frequency of the oscillator. More particularly, PNP transistors Q11 and Q12 have their emitters tied together and coupled to ground via resistor R11. The bases of the transistors are connected to opposite ends of a loop antenna L11 such, for example, as the types disclosed in U.S. Pat. Nos. 3,064,194 and 3,143,072. A capacitor C11 is coupled between the base of transistor Q11 and the collector transistor Q12. An identical capacitor is connected between the base of Q12 and the collector of Q11. Resistors R13 and R14 are connected between the base and collector of transisotrs Q11 and Q12, respectively. The center tap of loop L11 is connected to the negative side of a DC supply, the positive side of which is coupled to ground via resistor R12.

Loop antenna L11 effectively replaces r–f chokes L1 and L2 of FIG. 1. In so doing it not only serves as a transmit-receive antenna, but it also cooperates with capacitors C11 and C12 to provide a tank circuit which determines the oscillation frequency of the circuit. This arrangement is utilized with distinct advantage in integrated circuit structures wherein loop L11 can be a printed path laid down on a substrate or the like. Again, a 6*db* gain of the doppler signal is realized across R11 over the signal which would be obtained by use of a single detector.

Figure 3:
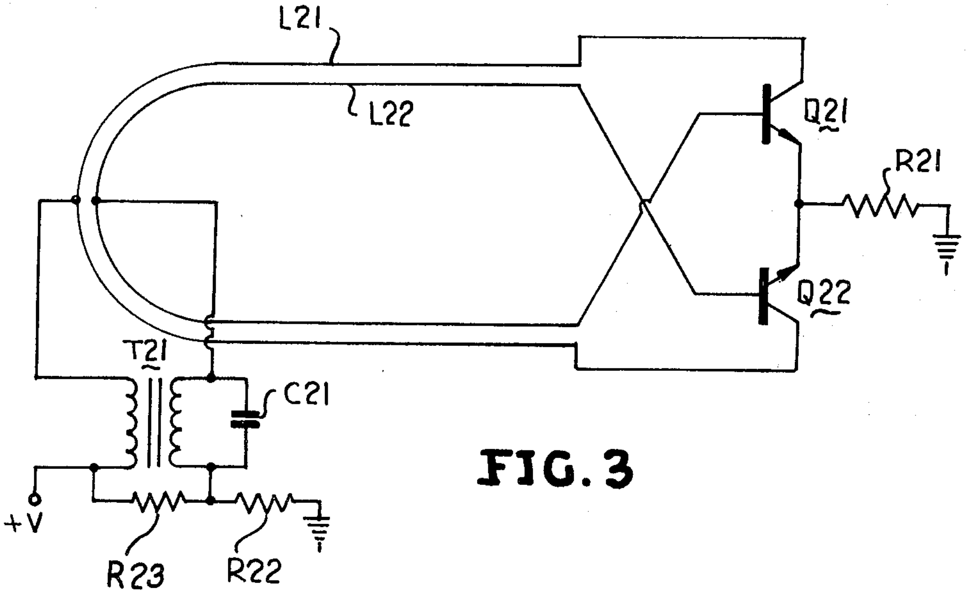
FIG. 3 is a schematic diagram of a modification of the circuit of FIG. 2.

The circuit of FIG. 2 can be further simplified by utilizing inductive coupling for the oscillator feedback instead of capacitive coupling. Such a circuit is illustrated in FIG. 3 wherein matched NPN transistors Q21 and Q22 have their emitters tied together and coupled to ground via resistor R21. The collectors of Q21 and Q22 are connected to opposite ends of loop antenna coil L21, the center tap of which is connected to the positive terminal +V of a DC supply. A similar loop antenna coil L22 interconnects the bases of Q21 and Q22 and is laid out adjacent to loop coil L21 to permit inductive coupling between the two. This inductive feedback coupling is properly phased for oscillation by cross-connecting the two coils such that the proximate ends of the coils are connected to the collector and base of different transistors. This arrangement eliminates the requirement for r–f chokes and at the same time permits convenient feedback control by means of spacing L21 and L22. Consequently, the internal capacitance of the transistors is not a significant factor in determining the operational characteristics of the device, whereas in the capacitive feedback arrangement of FIG. 2 the transistor capacitance must be considered, particularly at high frequencies.

By connecting another feedback mechanism in the circuit of FIG. 3, the transistors can be forced to oscillate at a low frequency in a parallel connection mode. More specifically, transformer T21 has a primary winding connected between +V and the center tap of L21; the secondary winding of T21 is connected to the center tap of L22 and is returned to ground via resistor R22. The latter is part of a voltage divider comprising resistors R23 and R22 connected between +V and ground. A capacitor C21 is connected in parallel with the secondary winding of transformer T21 and forms a low frequency tank circuit therewith.

Transistors Q21 and Q22 are essentially in parallel at frequencies below 10 MHz. Consequently, if the tank circuit connected to L22 is tuned to a frequency below 10 MHz the same two transistors (Q21, Q22) serve both as an r–f oscillator and a frequency modulator.

Importantly, the low frequency feedback coupling in FIG. 3 need not be inductive; that is, transformer T21 may be replaced by capacitive or other type feedback coupling suitable for the frequency range below 10 MHz. For example, an R-C type relaxation oscillator would be suitable for this purpose.

Figure 4:
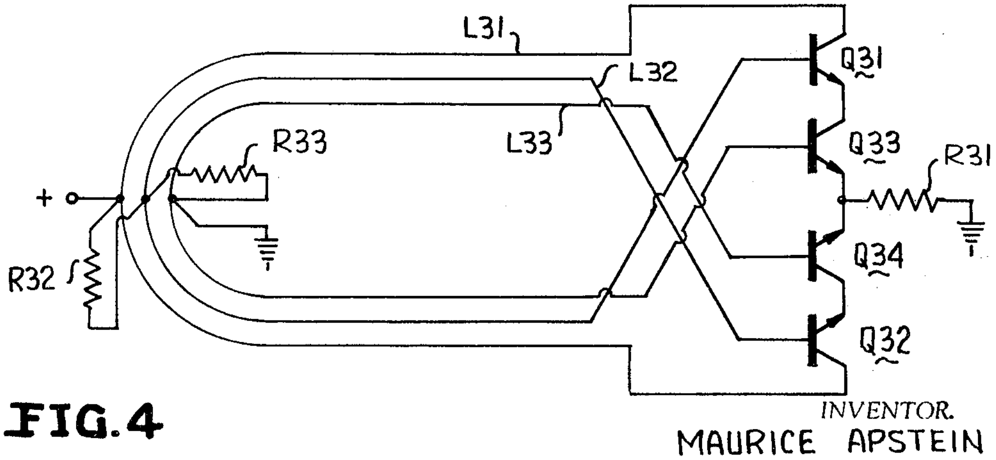
FIG. 4 is a push-pull oscillator employing two pairs of matched transistors and utilized in combination with a loop antenna and multiple inductive feedback coils in a proximity fuze.

The concepts set forth above can be expanded to employ multiple transistor pairs to significantly and efficiently increase the r–f output power of the fuze oscillator. Referring to FIG. 4, a first matched pair of NPN transistors Q31, Q32 and a second matched pair of NPN transistors Q33, Q34, are connected with their collector-emitter circuits in series. More particularly, the emitter of Q31 is connected directly to the collector of Q33, and the emitter of Q32 is connected directly to the collector of Q34. The emitters of Q33 and Q34 are tied together and coupled to ground via resistor R31. The collectors of Q31 and Q32 are connected to opposite ends of loop antenna coil L31, the center tap of which is tied to the positive terminal of a DC supply. A second loop antenna coil L32 interconnects the bases of transistors Q31 and Q32 and is positioned adjacent coil L31 such that the end of L31 which connects to the collector of Q31 is proximate the end of L32 which connects to the base of Q32. This cross-connection provides the necessary phase reversal in the inductive feedback to produce oscillation. A third antenna loop coil L33 is connected between the bases of transistors Q33 and Q34. L33 is also positioned relative to L31 to provide phase reversal in the inductive feedback for transistors Q33 and Q34. Resistors R32 and R33 form a voltage divider from the positive supply terminal to ground. The center tap of L32 is connected to the junction between R32 and R33; the center tap of L33 is connected to ground.

The circuit arrangement effectively places Q31 in series with Q32, and places Q33 in series with Q34. The series connected transistors are driven by twice the usual supply voltage to provide oscillations at nearly twice the power obtained with a single pair of transistors. This is in contradistinction to prior art series transistor connections, such as Darlington type connections, wherein the entire output comes essentially from a single output transistor. Feedback is from coil L31 to each of L32 and L33, the coil positions being adjusted to provide only that excitation required to effect oscillation. The multiple feedback coils, driven from a common coil L31 assure that each transistor pair is identically phased. Of course, any number of matched transistor pairs may be utilized.

The schematic representation of elements illustrated herein should not be limiting on the scope of the invention. For example, the various circuit elements may be discrete components or may form part of an integrated circuit structure. Transistor types (NPN, PNP) may be reversed as required by reversing supply polarity.

It should be understood that the invention is not limited to the exact details of construction shown and described herein for obvious modifications will occur to persons skilled in the art.

I claim:

1. A proximity fuze comprising:

a push-pull oscillator circuit for generating a radio frequency signal;

an antenna connected to said oscillator circuit for transmitting said generated signal and receiving reflected radio frequency signals;

said push-pull oscillator circuit comprising at least two matched electronic amplifiers interconnected in push-pull oscillatory configuration, said amplifiers each including:

at least one input terminal connected to receive said received radio frequency signals from said antenna;

a first output terminal connected to apply said generated radio frequency signal to said antenna; and a second output terminal, said second output terminals of said amplifiers being connected in common to a circuit output signal terminal;

whereby the difference frequency between the generated and received radio frequency signals passes through said amplifiers to said output signal terminal whereas the radio frequency components of the generated and received reflected output signals are oppositely phased and cancel at said output signal terminal.

2. The proximity fuze according to claim 1 wherein said antenna is a loop antenna comprising a reactive component in said push-pull oscillator circuit.

3. The proximity fuze according to claim 1 wherein:

said two amplifiers comprise first and second matched transistors, each having base, emitter and collector electrodes corresponding to said input terminal, second output terminal and first output terminal, respectively;

said antenna comprises a first loop antenna coil interconnecting said collector electrodes, and a second loop antenna interconnecting said base electrodes;

said oscillator circuit further includes:

means for DC-coupling said emitters to ground; and

DC supply means for supplying operating bias voltage to said transistors; and wherein said first and second coils are positioned to permit inductive feedback from said first coil to said second coil in the necessary phase relationship for causing said transistors to alternate on and off at opposite phase.

4. The proximity fuze according to claim 3 wherein said oscillator circuit comprises further feedback means for impressing a relatively low frequency modulation signal on said radio frequency signal.

5. The proximity fuze according to claim 4 wherein said further feedback means includes a transformer having a primary winding connected to said first coil and a secondary winding connected to said second coil, said further feedback means also including a capacitor connected in parallel with said secondary winding, said capacitor and said secondary winding being tuned to said relatively low frequency.

6. The proximity fuze according to claim 1 wherein:

said two amplifiers comprise first and second matched transistors, each having base, emitter and collector electrodes corresponding to said input, second output and first output terminals, respectively;

said antenna comprises a loop antenna coil connected between said base electrodes; and said oscillator circuit further comprises:

means for capacitively coupling the base of each of said transistors to the collector of the other of said transistors;

means for DC-coupling the emitters of said transistors to ground; and means for applying DC bias voltage to the center point of said loop antenna coil.

7. The proximity fuze according to claim 1 wherein;

said two amplifiers comprise first and second matched transistors, each having base, emitter and collector electrodes corresponding to said input, second output and first output terminals, respecively; and said oscillator circuit further comprises:

means for DC-coupling said emitter electrodes to ground;

a tank circuit tuned to said radio frequency and connected between said collector electrodes;

an r–f choke connected between said base electrodes;

means coupling said antenna to the center point of said r–f choke; and supply means for applying DC bias voltage to said transistors via said r–f choke and said tank circuit.

8. The proximity fuze according to claim 1 wherein said two amplifiers comprise first and second pairs of matched transistors, each transistor including a base, collector and emitter, the emitters of said second pair of transistors corresponding to said second output terminals, one transistor in said second pair having its collector connected to the emitter of one transistor of said first pair, the other transistor in said second pair having its collector connected to the emitter of the other transistor in said second pair, said circuit further comprising:

a first loop antenna coil connected between the collectors of said first pair of transistors;

a second loop antenna coil connected between the bases of said first pair of transistors;

a third loop antenna coil connected between the bases of said second pair of transistors;

wherein said second and third loop antenna coils are positioned proximate said first loop antenna coil to permit regenerative feedback from said first coil to each of said second and third coils.

* * * * *